(12) United States Patent
Corbett

(10) Patent No.: US 6,438,116 B1
(45) Date of Patent: Aug. 20, 2002

(54) ADAPTIVE POWER MARGIN FOR HARD HANDOFFS IN CODE DIVISION MULTIPLE ACCESS BASED SYSTEMS

(75) Inventor: Eddie Corbett, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 09/116,264

(22) Filed: Jul. 16, 1998

(51) Int. Cl.[7] ................................................ H04Q 7/20
(52) U.S. Cl. ....................................... 370/331; 455/522
(58) Field of Search ................................. 370/331, 332, 370/335, 342, 318; 455/436, 437, 522, 443

(56) References Cited

U.S. PATENT DOCUMENTS

| | | | |
|---|---|---|---|
| 4,696,027 A | 9/1987 | Bonta | 379/60 |
| 5,475,861 A | 12/1995 | Hall | 455/33.1 |
| 5,940,743 A | * 8/1999 | Sunay et al. | 455/69 |
| 5,987,326 A | * 11/1999 | Tiedemann, Jr. et al. | 455/442 |
| 6,055,427 A | * 4/2000 | Ojaniemi | 455/436 |
| 6,097,972 A | * 8/2000 | Saints et al. | 455/572 |
| 6,252,861 B1 | * 6/2001 | Bernstein et al. | 370/331 |

FOREIGN PATENT DOCUMENTS

| | | |
|---|---|---|
| EP | 680160 | 11/1995 |
| EP | 849967 | 6/1998 |
| WO | WO97/34439 | 9/1997 |
| WO | 98/04094 | 1/1998 |

* cited by examiner

Primary Examiner—Min Jung
(74) Attorney, Agent, or Firm—Burns, Doane, Swecker & Mathis, L.L.P.

(57) ABSTRACT

A technique for regulating the transmit power level for a mobile station following a hard handoff in a code division multiple access (CDMA) based system is disclosed. In an embodiment of the invention, a profile is developed from data associated with transmit power levels from a statistical collection of a plurality of hard handoff events. A power margin is derived from the profile such that it may be varied in accordance with high or low load conditions in the system. The power margin is then applied to mobiles performing hard handoffs such that they transmit only at the appropriate power level required for a sufficient connection in the cell. The technique provides an automated and dynamic power margin which is scalable according to the varying loading conditions in the system. The invention reduces the amount of interference generated by transmitting at unnecessarily high power levels following hard handoffs thereby improving the overall performance and connection quality of the system.

9 Claims, 2 Drawing Sheets

ADAPTIVE POWER MARGIN FOR HARD HANDOFFS IN CODE DIVISION MULTIPLE ACCESS BASED SYSTEMS

FIELD OF THE INVENTION

The present invention relates generally to wireless radio telecommunication systems. More specifically, the invention relates to a method of reducing the interference generated by mobile station transmitting at an inappropriately high power level following a hard handoff.

BACKGROUND OF THE INVENTION

In a basic cellular telecommunication system, as illustrated in FIG. 1, a system controller is linked to a network of base stations by a series of digital transmission links 115. The base stations are geographically dispersed to form an area of coverage for the system. Each base station (BS) is designated to cover a specified area, known as a cell, in which a two way radio communication connection can take place between a mobile station and the BS in the associated cell. In this simplified exemplary depiction, only two base stations are shown but in practice, a substantial multiplicity of base stations will form the functional coverage area for the system. It is understood by those skilled in the art that other components and devices are typically included in the system that are not shown in the exemplary illustration. In general, as the MS moves throughout the network, communications are maintained with the network by transferring the connection to a neighboring base station in an event referred to as a handoff. For simplicity, the term mobile station will henceforth be referred to as the mobile.

In telecommunication systems operating in accordance with core division multiple access (CDMA), mobiles may simultaneously communicate with more than one BS prior to a handoff from an originating BS to a neighboring BS. This is referred to in the art as "soft handoff" in that the mobile will commence communication with the neighboring BS before terminating communication with the originating BS. This "make before break" procedure is made possible by operating all traffic on a common spread spectrum waveform frequency. A variant of the soft handoff is what is referred to as "softer handoff" in which the mobile simultaneously communicates with multiple sectors of the same BS. There are several advantages associated with soft handoffs such as reduced risk of dropped calls, no interruption in speech upon handoff, increased gain in downlink signal-to-noise ratio, and greater protection from log normal and multi-path fading since, on average, the convergence from the effects of fading or multi-paths do not occur at the same time.

In an exemplary CDMA system, handoff decisions are typically based on the detection by the mobile of the signal strength of pilot signals transmitted by neighboring base stations. The pilot signals are distinguished by a pseudonoise sequence (PN) such that the mobile is able to determine and allocate the base station within a distinct classification set. By way of example, the sets include an Active Set which is a set of base stations that the mobile is actively communicating with, a Candidate Set which is a set of base stations that have a pilot strength that are sufficient for communications based on system parameters set by the base station, and a Neighbor Set which is a set of base stations in the area that have a pilot strength indicating the potential for sufficient communication with the mobile. The base station's classification within a set may be modified in accordance with the received pilot signal strength by the mobile. Handoff decisions are then made by the system controller which are typically based in part on the reported pilot signal strength.

Another type of handoff that occurs in CDMA systems is a "hard handoff" which is a handoff that takes place, for example, between two frequencies or when the base stations are not suitably synchronized for a soft handoff. This type of handoff is often characterized as "break before make" since communication on a first frequency is terminated before communication is established on a second frequency. Hard handoffs occurring within the same cell are referred to as intra-cell hard handoffs and those occurring between cells are referred to as inter-cell hard handoffs. Hard handoffs typically occur in situations where vendor equipment limitations preclude performing soft handoffs such as, for example, layer changes for moving mobiles, mode switches e.g. in dual mode systems, switching between operator networks, and resource allocation issues that require intra-frequency hard handoffs.

The disadvantages of performing hard handoffs include an increased probability of dropped calls, speech interruption, and loss of soft handoff gain. Furthermore, hard handoffs may negatively affect the performance and, the overall quality of the connections within the system. By way of example, a notable problem within an exemplary CDMA system is regulation of the transmit power level emitted from a mobile immediately following a hard handoff. This may happen, when a mobile at the edge of a coverage area is communicating with its serving BS and is thereby transmitting at high power. The mobile in this situation can be significantly closer to the neighboring BS thus a handoff at this point at the current high power level will create substantial interference in the new cell since a relatively low power is adequate to sustain communication in the new cell. The situation can also be exacerbated by shifting cell borders due to cell shrinkage/expansion resulting from an increased/decreased number of active mobiles within the serving cell. The tendency for cells to shrink and expand in relation to capacity is known in the art as cell breathing and is a notable factor in the system layout design.

Following a hard handoff, the mobile cannot know the appropriate transmit power level since the neighboring BS is not able to control the mobile's power level as long as it is still connected to the original serving BS. As a result, the mobile may enter the new cell at an excessively high power level thus generating a burst of uplink interference which thereby degrades the connection quality of other mobiles sharing the same frequency. Once in the new cell, the power level is gradually adjusted by a power control algorithm in order to bring mobile within suitable, operating limits.

One solution that has been proposed is to anticipate a reduction in power following the hard handoff. In for example CDMA networks operating in accordance with IS-95B, a cell parameter INIT_PWR is used together with the power control algorithm in an attempt to reduce the power level to the appropriate required power level in the new cell. The cell parameter INIT_PWR is implemented for use in the reduction of the power level by immediately reducing the power following a hard handoff. This reduction in the power level is referred to as the power margin, and is typically on the order of 3 dBm but may be set to any level by individual operators. The implementation of the INIT_PWR parameter in IS-95A was not originally intended for power control issues associated with hard handoffs but instead its specified use was for the reduction of mobile transmit power upon first access for which the appropriate power level is not known.

A disadvantage of using the INIT_PWR parameter in this way is that the specified reduction may not be suitable for all operation conditions since the power level required for sufficient communication may vary over time, for example, due to cell breathing. This is illustrated by depictions of the power level activity throughout the day for individual cells. For example, daytime mobile transmission power is typically higher prior to a handoff due to cell breathing from the increased interference from more operating mobiles in the system and from other interference sources. In contrast, nighttime operation typically shows that transmission power levels are relatively constant before and after a handoff event, thus an obligatory drop in transmission power may unnecessarily degrade signal quality. Since the magnitude of the required reduction may vary throughout the day, the relative inflexibility of the prior solution, e.g. with a fixed INIT_PWR, may not always result in optimum operating levels.

In view of the foregoing, it is an objective of the present invention to provide for an improved power regulation technique for mobiles following hard handoffs.

SUMMARY OF THE INVENTION

Briefly described, and in accordance with an embodiment thereof, the invention discloses a method of reducing the power level transmitted by a mobile following a hard handoff in a code division multiple access based system. The method includes building a database containing data associated with the transmit power levels from a statistical collection of hard handoff events. A profile of the data is developed in order to determine an adequate power margin to be applied to mobiles that perform hard handoffs between specific cells or specific locations. The power margin can then be applied, scaled down, or removed based on the current loading on the system or other relevant factors.

The present invention provides an effective means for reducing the amount of interference generated by mobiles transmitting at unnecessarily high power levels thus improving the overall performance and quality in the system. These and other advantages of the present invention will become apparent upon reading the following detailed descriptions and studying the various figures of the drawings.

BRIEF DESCRIPTION OF THE DRAWINGS

The invention, together with further objects and advantages thereof, may best be understood by reference to the following description taken in conjunction with the accompanying drawings in which.

DETAILED DESCRIPTION OF THE PREFERRED EMBODIMENTS

Hard handoffs that occur within a CDMA system, as mentioned previously, typically have a number of effects on the network. It is generally preferable to perform a soft handoff in most situations but this may not be possible in all cases due to incompatibilities and equipment limitations. Hard handoffs can affect the performance of the system from the possible introduction of unnecessarily high levels of interference in the new cell due to the inability of the new base station to control the power level of the mobile during the handoff. The following description is directed toward an improved technique for reducing mobile transmit power levels following hard handoffs.

Figure 1:
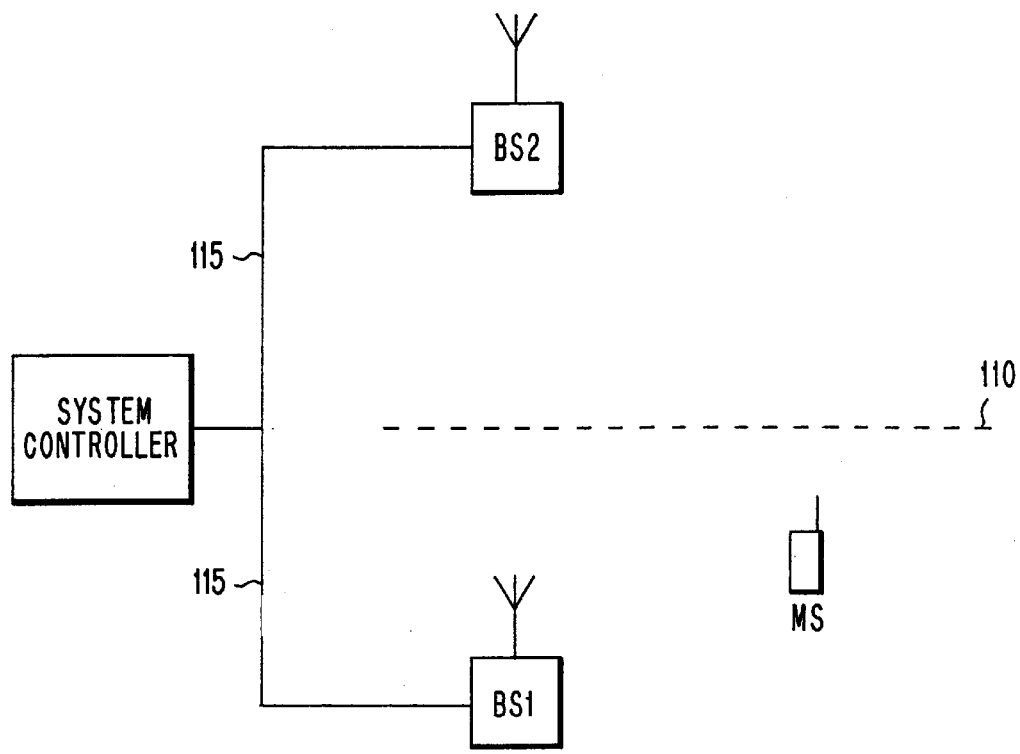
FIG. 1 illustrates a simplified exemplary wireless telecommunication system.
Figure 2:
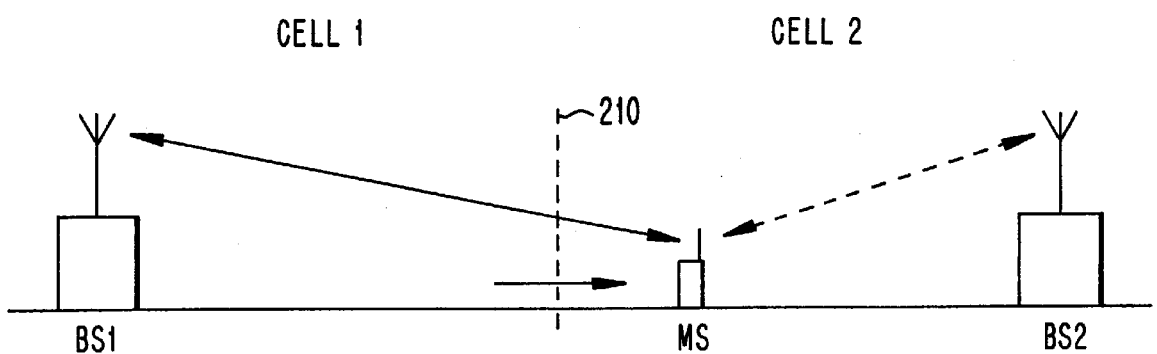
FIG. 2 illustrates an exemplary depiction of the effects from a hard handoff.

Consider the situation illustrated in FIG. 2. Shown is a simplified wireless telecommunication system depicting an exemplary progression leading to a hard handoff situation. Shown is base station BS1 providing communication services for cell 1 and base station BS2 serving cell 2. The border between the two cells is indicated by line 210 which represents the edge of the coverage areas of the respective cells. In an example of a typical handoff procedure, BS1 has an initial established connection with the MS within cell 1. As the MS moves toward the BS2, a handoff may occur while the MS is substantially within cell 2. At the point just prior to the handoff, the MS is transmitting to BS1 at a relatively high power level due to ordinary path loss at that distance. In addition, as more users begin to operate in cell 1, the effects of cell breathing can cause the cell border 210 to move toward BS1 which may further compel the mobile to transmit at higher power levels to remain in contact with BS1. Since the MS may be significantly closer to BS2, a lower transmission power level is required for a connection with BS2. Thus the initial effect from a hard handoff transmitting at the previous high power level without appropriate power control generates a burst of interference within cell 2.

In accordance with an exemplary embodiment of the present invention, the transmitted power level data of mobiles is collected before and after the execution of a hard handoff between cells or sectors. Statistics may be collected throughout the day by the system controller during periods of variable traffic activity in order to obtain a profile representative of the distribution. The profile represents an interpretation of the data and can be derived by using any number of well known statistical operations such as averaging, for example. The handoff statistics may be collected over days, weeks or even months such that a database is developed that may show a pattern that is indicative of pre-handoff and post-handoff power levels. By way of example, a suitable number of power level samples may be taken before and after a handoff in order to gauge the difference in the levels.

One way to obtain samples is for the system controller to keep a first-in-last-out (FILO) type running buffer of approximately 4 seconds of power level samples such that when a handoff event occurs, samples are taken for an additional 2 seconds afterward. Since the mobile makes power level updates to the system at a rate of approximately 800 updates per second, the statistics contained in the buffer may be averaged for the pre-handoff 2 seconds and the post-handoff 2 seconds in order to determine the average power difference. Another technique may be to trigger the recording of power level samples from a handoff request sent by the mobile the BS or another associated event signifying that a handoff is forthcoming. The statistical information indicating the power level difference may be used to estimate an adequate power margin. In this way, the cell parameter INIT_PWR, which is typically sent with the handoff message, can be dynamically tuned to its optimum value.

An adequate power margin permits the mobile to enter the new cell or sector with a lower power level which, if too low, may cause the mobile to suffer a high frame erasure rate (FER) until it is ramped up by the power control algorithm. The situation where the individual mobile is temporarily inconvenienced is considered preferable to the disturbance experienced by other operating mobiles since all mobiles sharing that frequency will be affected by the interference generated by the errant mobile.

As known by those skilled in the art, there can be a significant variation in power levels when operating in daytime high load conditions versus nighttime low load conditions. During daytime high load times, the interference is typically relatively higher as compared to low load times due to the additional traffic during the day and other interference sources. One useful measure associated with the level interference is the $E_c/I_o$ ratio, wherein $E_c/I_o$ is the energy per chip divided by the power spectral density of the interference thus is indicative of the quality and strength of coverage. It is desirable to maintain a roughly constant $E_c/I_o$ value such that satisfactory quality exists throughout the system. As the interference level $I_o$ increases, the power $E_c$ must be increased correspondingly in order to maintain similar connection quality. This can occur, for example, when the power control algorithm directs the mobile to increase power in response to cell breathing as more users enter the system or the mobile moves away from the serving BS.

Under nighttime or low interference conditions, the application of a power margin may negatively impact system performance by the lowering power level below that required for a sufficient connection. Thus in the embodiment of the invention, the power margin INIT_PWR parameter can be applied during the daytime and removed completely or significantly lowered during the night based on the collected statistics.

Figure 3:
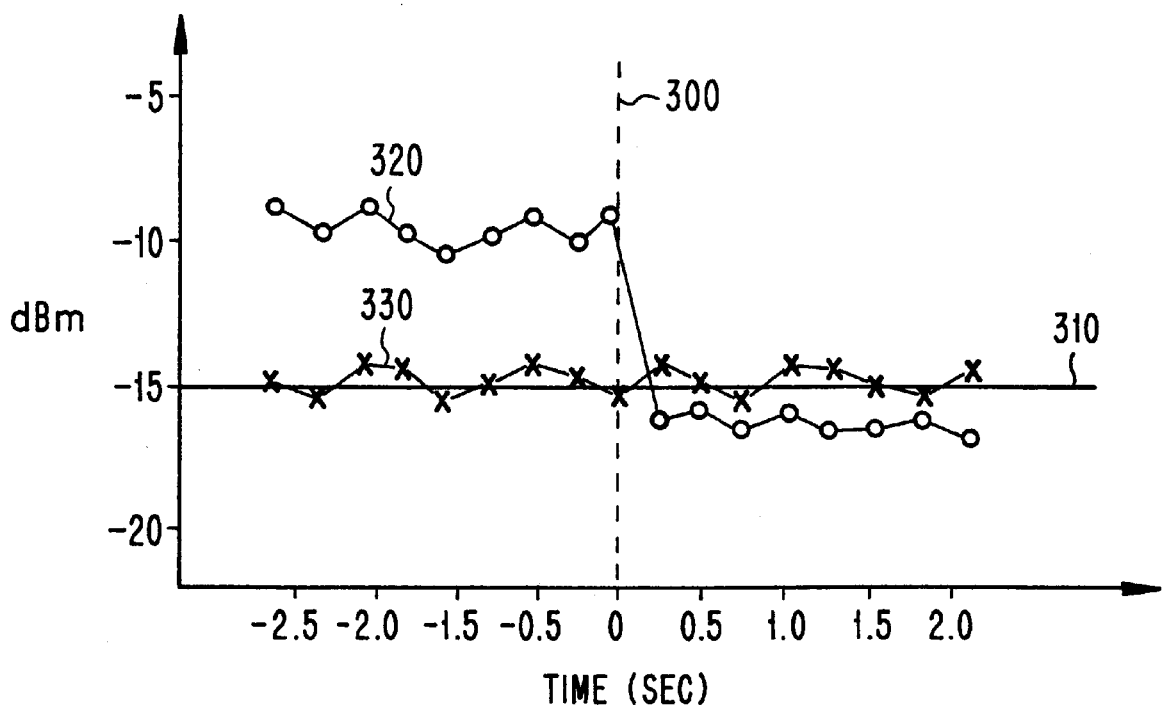
FIG. 3 is an exemplary plot of transmission power for a mobile operating in accordance with the present invention.

FIG. 3 shows an exemplary plot of the transmit power for a mobile operating in accordance with the present invention for the time periods immediately before and after a hard handoff. Curve 320 represents the transmit power level by a mobile during daytime operation. The handoff event occurs at time zero which is represented by line 300. In the time period just prior to the handoff, the mobile is transmitting at a relatively high power level due to being close to the edge of the cell of the serving BS or due to the loading of the cell, for example. At the point just after the handoff, the application of a power margin causes the transmit power to drop approximately 6 dBm to a level that is closer to an appropriate level for a sufficient connection in the new cell, as represented by line 310. Curve 330 represents the mobile transmit power while operating at night with no power margin reduction applied. The power level remains fairly consistent throughout the handoff and thus shows virtually no effect associated with the hard handoff under these conditions.

The present invention contemplates the use of a dynamic power margin for improved power control for hard handoffs in CDMA based systems and is especially suitable for use in countering the effects of cell breathing. The power margin parameter may be automated for individual conditions on a cell-to-cell or sector-to-sector basis to suit various levels of traffic. The result of improved power control reduces the interference in the system thereby improving the overall connection quality.

It should be understood that the embodiment shown herein is merely exemplary and that one skilled in the art can make variations and modifications to the embodiment without departing from the spirit and scope of the invention. In particular, in addition to the power level, other types of statistics may be collected such as the bit error rate (BER), frame erasure rate (FER), and interference which may be indicative of problems associated with hard handoffs. Furthermore, the invention is applicable to other types of CDMA based systems and thus is not to be limited to the particular power margin parameter discussed. All such variations and modifications are intended to be included within the scope of the invention as defined by the appended claims.

What is claimed is:

1. Method of regulating the power level transmitted by a mobile following a hard handoff in a code division multiple access based wireless telecommunication system comprising the steps of:

collecting statistics including power level data associated with a plurality of hard handoff events;

developing a profile of transmit power levels from said collected statistics;

determining an adequate power margin from said profile; and applying said power margin to said mobile following a hard handoff.

2. A method according to claim 1 wherein said profile is developed from a statistical collection of hard handoff events.

3. A method according to claim 1 wherein the determining of an adequate power margin step is based on the average power level change from the plurality of hard handoff events.

4. A method according to claim 1 wherein the power margin is based on the load condition in the system.

5. A method according to claim 1 wherein said applying step includes the application of said power margin when operating during high load conditions in the system and wherein said power margin is substantially reduced or removed during low load conditions in the system.

6. In a code division multiple access based wireless telecommunication system comprising a system controller, a plurality of base stations, and a plurality of mobile stations capable of wireless communication with said base stations, an apparatus for regulating the power level transmitted by a mobile following a hard handoff comprising:

a database containing transmit power level data associated with a multiplicity of hard handoff events;

a profile of data derived from said power level data for determining an adequate power margin for hard handoffs; and a power control algorithm including said power margin for regulating the power level transmitted by the mobile station.

7. A system according to claim 6 wherein said database is located in said system controller.

8. A system according to claim 6 wherein said profile is representative of a pattern of power level data associated with a statistical collection of hard handoffs.

9. A system according to claim 6 wherein said power margin is included in a handoff message sent from the system controller to the mobile via an associated base stations.

* * * * *